March 22, 1960

C. B. NAGELMANN 2,929,205

LONG STROKE COMBUSTION ENGINE

Filed Oct. 14, 1957

Clemens B. Nagelmann
INVENTOR.

BY

Clemens B. Nagelmann
INVENTOR.

United States Patent Office 2,929,205
Patented Mar. 22, 1960

1

2,929,205

LONG STROKE COMBUSTION ENGINE

Clemens B. Nagelmann, Santa Barbara, Calif.

Application October 14, 1957, Serial No. 690,049

12 Claims. (Cl. 60—39.6)

This invention comprises a novel and useful long stroke combustion engine and more particularly relates to a power plant having both the cylinders and pistons thereof movable in order to increase the effective stroke of the same.

The primary purpose of this invention is to provide a combustion engine in which the products of combustion are more effectively employed to produce motive power.

A further object of the invention is to provide an apparatus in which the cylinders and the pistons therein are connected to the cranks on different sets of crankshafts whereby to obtain motion of the cylinders and pistons towards and from each other and thereby secure a relatively greater working stroke.

Yet another object of the invention is to provide an apparatus in accordance with the foregoing objects wherein the crankshafts are utilized as part of the fluid inlet and outlet systems for the various cylinders; and wherein valve means are employed in the crankshafts for controlling flow of fluids into and from the cylinders.

Still another object of the invention is to provide a power plant consisting of compressor cylinders and working cylinders associated in a novel and improved manner for more effectively obtaining and utilizing combustion products.

An additional object of this invention is to provide a power plant with novel and efficient means whereby air is heated by combustion products to increase its volume and is then employed with combustion products as a fluid under pressure to operate the power cylinders of the apparatus.

Yet another object of the invention is to provide a heat engine of greater efficiency by eliminating the usual cooling radiators and employing thermal insulation to reduce all possible heat losses.

An important object is to provide an engine wherein the thickness of the cylinder walls may be reduced with the cylinder working pressures being equal to the pressures in the compressed air tank and the combustion products generator.

Still another object is to provide an engine wherein the side thrust of the pistons in the cylinders is eliminated.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

2

Figure 1:
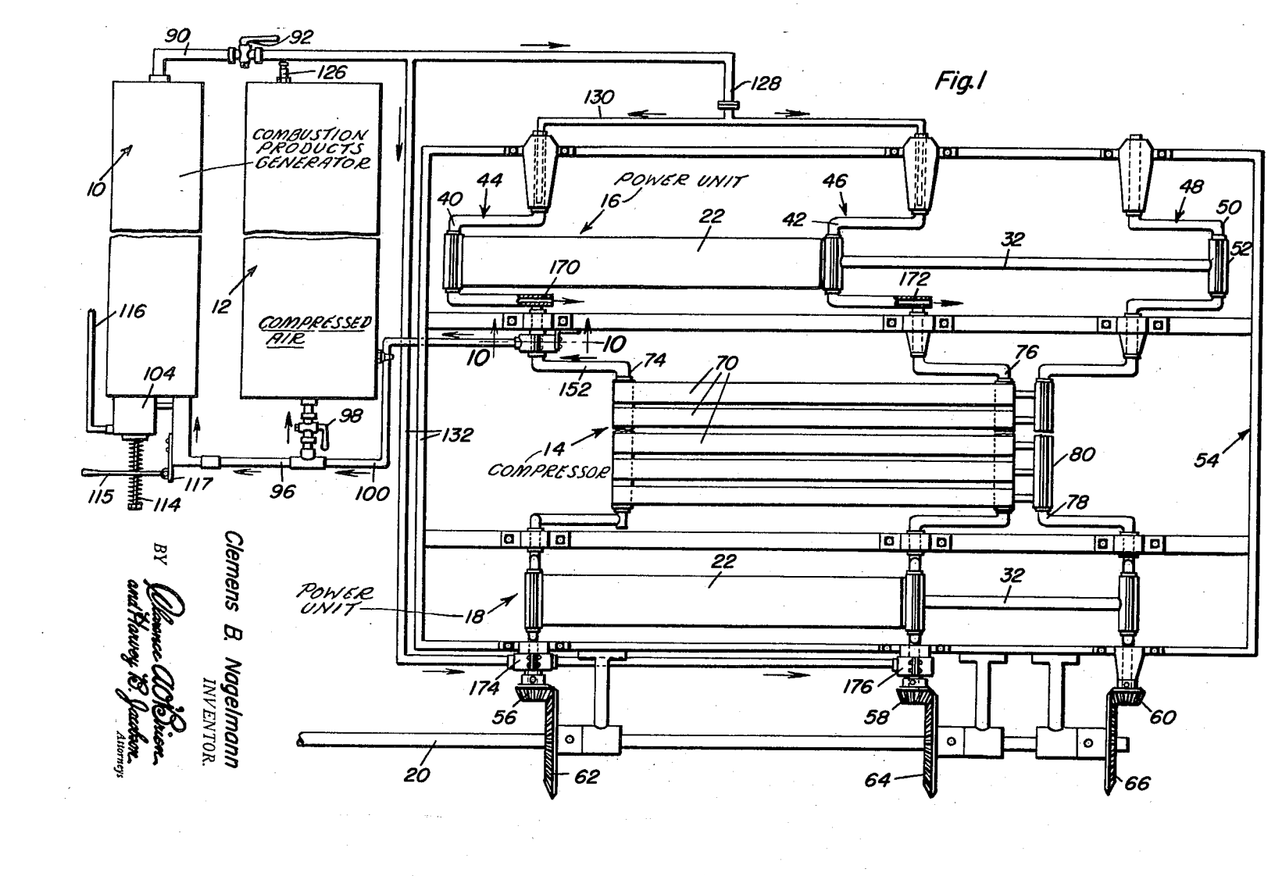
Figure 1 is a schematic and somewhat diagrammatic plan view of a power plant in accordance with this invention.

Referring first to Figure 1 it will be seen that the power plant forming the subject matter of this invention consists of a combustion products generator 10, a compressed air storage tank 12, a compressor unit 14 together with power units 16 and 18. The compressor and power units are operatively connected together and to a common power shaft 20 disposed at one side of the apparatus whereby all of these units are synchronized in their operation and whereby power is delivered by the unit.

Basically, in the operation of the power plant, air is compressed in the compressor unit 14, and is delivered to the air storage tank 12 and from thence to the combustion products generator 10. From the latter the combustion products under pressure are delivered to the pair of power units 16 and 18 where the compressed combustion products transfer their power into rotation of the crank shafts connecting the power and compressor units and thus to the drive shaft 20.

In order to improve the efficiency of operation of the power plant, an extra long stroke is given to the pistons and cylinders of both the power units 16 and 18 and the compressor unit 14. For this purpose, the cylinders and pistons of these units are mounted upon parallel crankshafts whereby both cylinders and pistons are rotated in unison but in opposite directions to thus secure relatively long working strokes of the pistons in their cylinders. Air is supplied to and compressed air is discharged from the compressor unit 14 through a valving mechanism carried by one of the crankshafts which supports one end of the compressor cylinders, while combustion products are delivered to and discharged from the cylinders of the power units 16 and 18 by valve assemblies disposed in both of the crankshafts supporting the two ends of each of the power cylinders.

All of the crank throws are of the same size whereby each cylinder and its connecting rod has relative straight line movement of the same length; each power unit 16 and 18 and the compressor unit 14 being maintained in parallel relation during their rotation by the associated crankshafts.

Preferably the crank throws supporting the power unit 16 are disposed at 90° to those supporting the unit 18 whereby to minimize dead center positions of the apparatus. This operation is apparent from the view of Figure 1.

*Power unit of the power plant*

Attention is first directed to the cylinder and piston assemblies of the power units and their supporting and driving mechanism.

Figure 5:
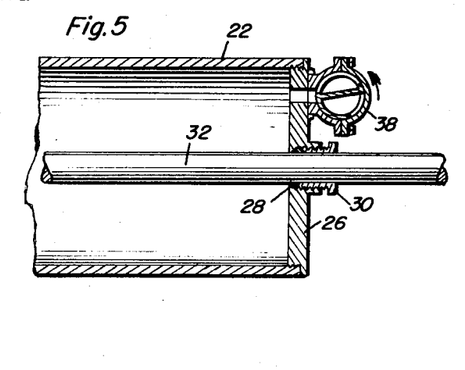
Figure 5 is a vertical longitudinal sectional view taken substantially upon the plane indicated by the section line 5—5 of Figure 4.
Figure 6:
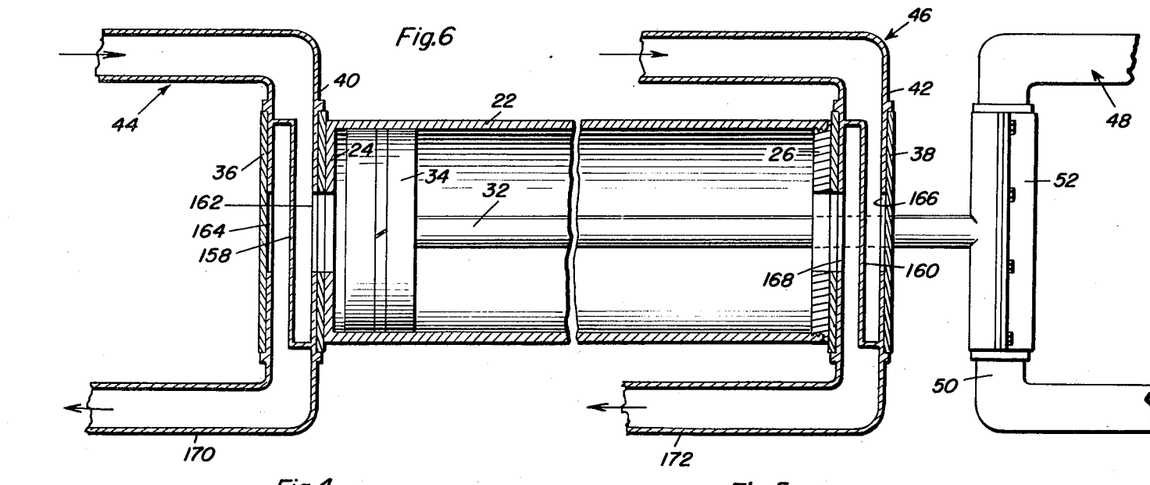
Figure 6 is an enlarged view in horizontal section through the cylinder and piston of a power unit, parts being broken away, and showing the intake and exhaust valve mechanism disposed in the crank throws of the unit.

Referring now particularly to the embodiment of Figures 1–6 and especially to Figures 5 and 6, it will be seen that the power units 16 and 18 each consists of cylinders 22 which are closed at one end as by fixed end walls 24, and are closed at their other end by removable end walls 26. The removable end walls are provided with apertures 28 therethrough together with packing glands 30 for slidably receiving therethrough the piston rods 32 having each a piston 34 reciprocable in a cylinder. The two opposite end walls 24 and 26 of the working cylinders are provided, adjacent their upper portions as in Figure 3, with fixedly mounted transversely extending sleeves 36 and 38 which are journaled upon the parallel crank throws 40 and 42 of a pair of crankshafts 44 and 46 respectively by means of which the working or power cylinders 22 are given a translatory rotary motion in parallel positions about the axes of the crankshafts. A further crankshaft 48 provided with a crank throw 50 supports the connecting rod bearing 52 of the piston rod 32. It will be observed especially from Figures 1–3 that the crankshafts are disposed in parallel relation with their axes lying in a common horizontal plane and having throws of equal length but the throw 50 being disposed oppositely to the throws 40 and 42.

At one end of each of the crankshafts, as shown in Figure 1, beyond any suitable supporting framework designated generally by the numeral 54 the crankshafts 44, 46 and 48 are respectively provided with bevel gears 56, 58 and 60 which mesh with bevel gears 62, 64 and 66 secured to the power shaft 20. Thus the three crankshafts are geared together for simultaneous rotation, with the shafts 44 and 46 rotating in the same direction. The crank throws of these shafts are so disposed that the crank throws 40 and 42 of the crankshafts 44 and 46 are disposed in the same angular positions, while the throws 50 of the shaft 48 are disposed at 180° relative thereto. It will be seen by comparing the showing of Figures 2 and 6 with that of Figure 1 that upon one complete rotation of these crankshafts there will be a resultant effective stroke of a piston in its cylinder of four times the length of a crank throw. Thus a very long stroke is provided in each of the working cylinders 22 which greatly increases the efficiency in utilizing the power of the expansible combustion products.

As will be especially observed from Figure 1, the crank throws of the power unit 16 are disposed at 90° from those of the power unit 18. Thus the crankshafts and the power shaft 20 have power applied thereto from each of the two power units at separate time intervals.

It may be here noted that in the embodiment of Figures 1–6, each of the crankshafts 44, 46 and 48 comprises a continuous crankshaft extending entirely across the width of the frame 54 of the apparatus.

It should be understood that it is preferable to provide thermal insulation of any suitable character upon the working cylinders and all parts receiving therein the combustion products in order to reduce heat losses to a minimum and thereby improve the thermal efficiency of the apparatus, although this has been omitted from the drawings in the interest of simplicity of illustration.

*Compressor unit*

Figures 7, 8, 9, 11, 12:
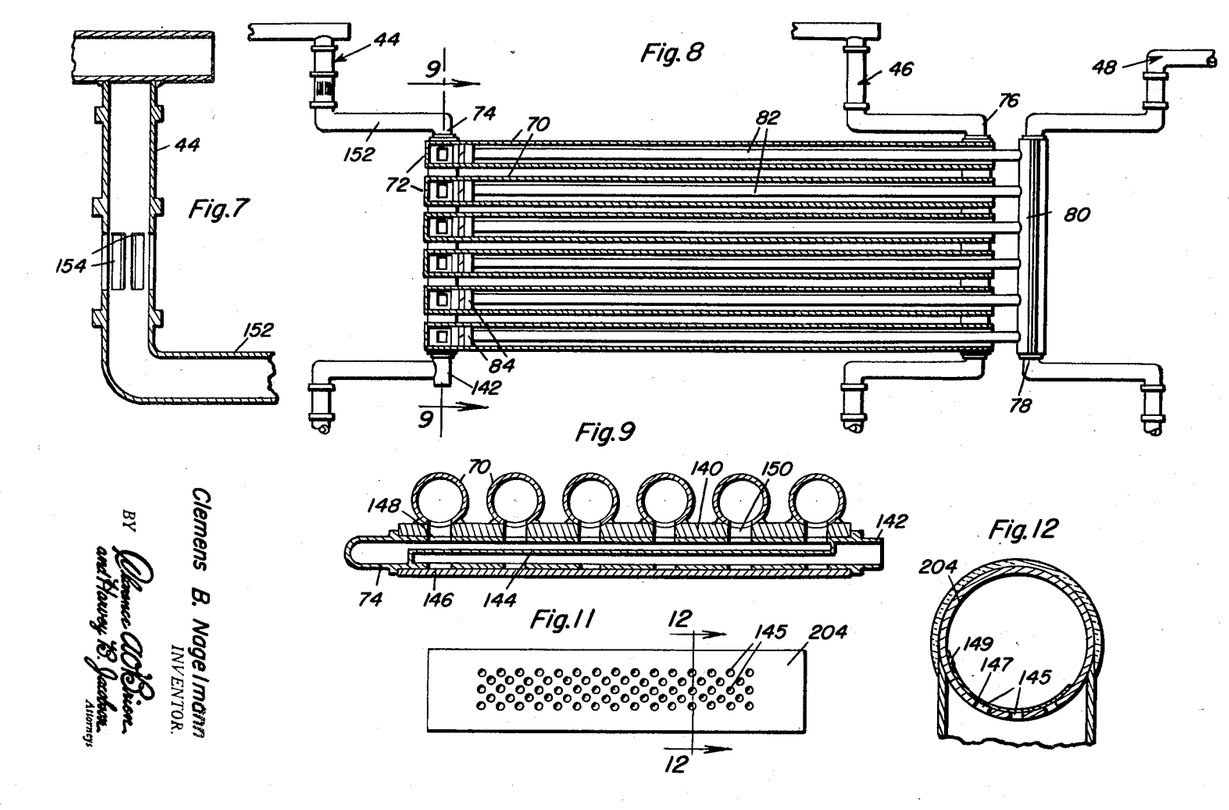
Figure 7 is a fragmentary view in section of a portion of the manifold system of Figure 8 of the device.
Figure 8 is a view in horizontal section through the compressor unit of the power plant, parts being broken away and parts being shown in plan.
Figure 9 is a vertical longitudinal sectional view taken through a crankshaft substantially upon the plane indicated by the section line 9—9 of Figure 8 and showing the intake and exhaust valve construction and its disposition in the crank throw of the compressor unit.
Figure 11 is a bottom plan view of a modified form of the valve mechanism of the compressor unit.
Figure 12 is a vertical transverse sectional view taken substantially upon the plane indicated by the section line 12—12 of Figure 11.

The compressor unit 14, Figures 1, 7–10, comprises a plurality of identical compressor cylinders 70 which as shown in Figures 1 and 8 have closed end walls or heads 72 at one end thereof by which these cylinders are journaled upon the crank throw 74 of the crankshaft 44. The other ends of the cylinders are open, and are journaled on the crank throws 76 of the crankshaft 46, while the other crankshaft 48 has a crank throw 78 upon which is journaled a single connecting rod bearing 80 to which each of a plurality of piston rods or connecting rods 82 of the compressor pistons 84 are secured. In a manner to be subsequently set forth, each of the compressor cylinders inducts a charge of air, compresses the same, and discharges this compressed air to the storage tank 12 and/or to the combustion products generator 10 as set forth hereinafter. It will be observed that the crank throws 74, 76 and 78 have the same relation to each other as do the crank throws of the power units in order to effect the same length of stroke of the compressor unit cylinders.

It will be appreciated, however, that if desired the throws of one power cylinder unit may differ from those of the other, while the throws of the compressor cylinder unit may likewise differ from those of the power cylinder units if desired.

Air is inducted into the cylinders of the compressor unit and after compression is discharged therefrom to the reservoir 12 through valve assemblies forming part of the connection of the crankshaft 44 to the compressor unit cylinders. Reference will be made specifically to the fluid inlet and outlet system more specifically hereinafter.

*Combustion products generator*

Attention is now directed more specifically to Figure 1 in conjunction with Figures 13–16 for an understanding of the construction and operation of the combustion products generator 10. The generator 10 comprises a casing which may be cylindrical and vertical in nature and has a discharge conduit 90 at the upper end thereof for discharging combustion products therefrom to the power units 16 and 18 as set forth hereinafter. A manual control valve 92 may be provided to control the flow of combustion products from the generator 10 through the discharge conduit. At its lower end the casing or chamber is provided with a combustible gas mixing nozzle 94 which extends upwardly into the lower end of the casing of the generator. This nozzle at its lower end receives compressed air through a conduit 96 either from the compressed air reservoir 12, through a manual control valve 98 or from a conduit 100 which receives the compressed air from the compressor unit 14 in a manner to be subsequently set forth.

Figures 13, 14, 15, 16:
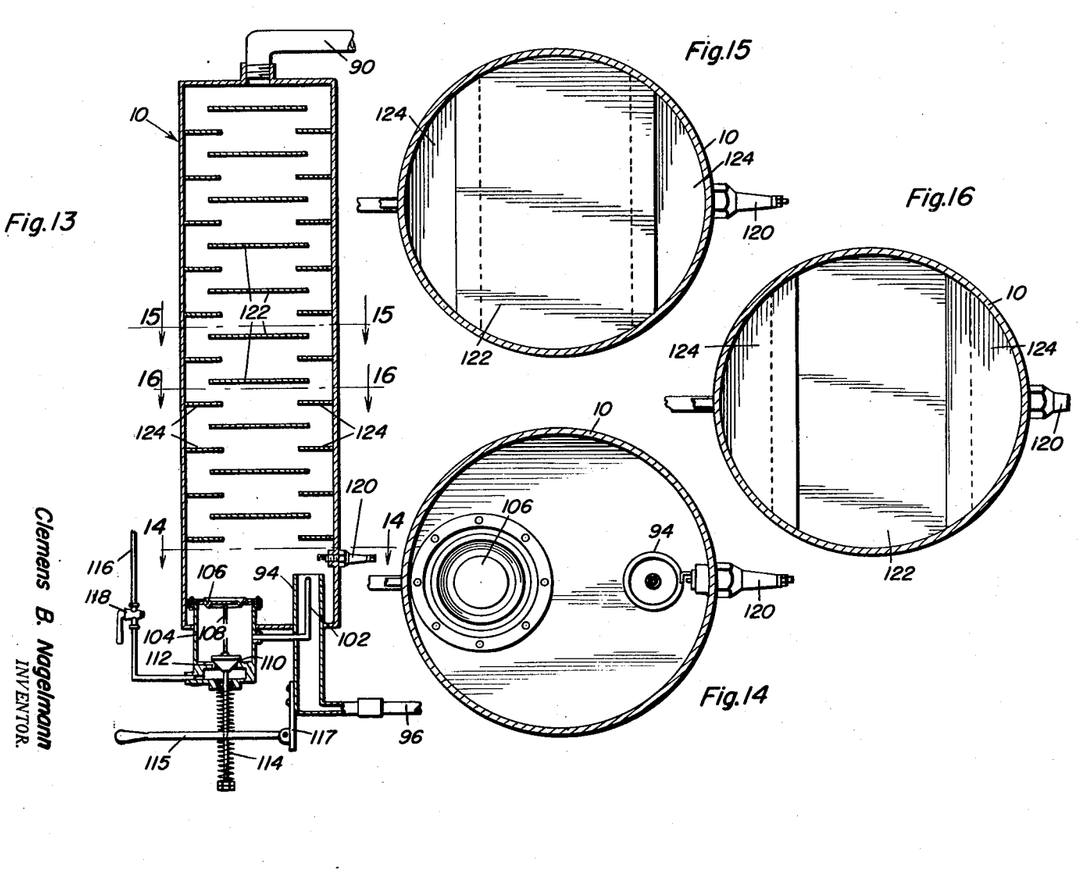
Figure 13 is a view in vertical central section through the combustion products generator of the power plant.
Figures 14–16 are horizontal sectional detail views taken on enlarged scales substantially upon the planes indicated by the section lines 14—14, 15—15 and 16—16 respectively of Figure 13.

Extending into the mixing nozzle 94 is a fuel nozzle 102 which delivers under pressure a fuel, either gaseous or liquid as desired, into the air stream from the conduit 96 for mixing therewith to provide a combustible mixture.

The supply of fuel to the nozzle 102 is controlled automatically in response to the pressure of combustion existing in the generator 10. For this purpose there is provided a casing 104 extending into the lower end of the generator housing and which is provided at its open upper end with a diaphragm 106 exposed to the pressure prevailing within the housing. The diaphragm is connected as by a rod 108 to a fuel control valve 110 cooperating with a valve seat 112 carried by that portion of the casing which lies outside the generator 10. A spring 114 serves to maintain the valve in closed position until the valve is opened by the actuation of the diaphragm, which latter is inherently biased to normally open the valve against the spring 114 except when a certain minimum pressure prevails in the chamber of the generator 10 and acts upon the diaphragm. A fuel conduit 116 provided with a manual control valve 118 supplied fuel to the valve seat for admission past the valve into the nozzle 102, which latter communicates with the space between the valve and the diaphragm 106. Thus, the closing pressure of the valve spring 114 in conjunction with the pressure prevailing in the combustion chamber and is opposed by the pressure of the fuel below the diaphragm in the casing 104 for automatically feeding fuel to the mixing nozzle 94 in proportion to the pressure prevailing within the generator casing.

A spark plug 120 operated from any suitable source, not shown, extends into the generator casing adjacent or in proximity to the combustion nozzle 94 for igniting the combustible mixture discharged by this nozzle and thereby initiates and/or maintains combustion in the generator. In order to effect most efficient combustion and mixing of the combustion products with the incoming air supplied through the conduit 96, the casing of the generator 10 is provided with a considerable number of vertically spaced interdigitated baffle plates which compel the burning gases to pursue a tortuous path upwardly through the generator before they discharge through the combustion products discharge conduit 90, thereby ensuring complete combustion in the generator. As shown more clearly in the detail views of Figures 15 and 16, the baffle assembly comprises a series of diametrically disposed baffle plates 122 which extend across the casing of the generator 10 and thus leave passages at the opposite sides of these baffles, together with sets of chordally disposed intermediate baffles 124 which are disposed in pairs on opposite sides of and overlapping the adjacent side edges of the central baffles 122.

The system is so arranged that when the compressor unit 14 is operated in order to supply compressed air by the conduit 100, or the manual valve 98 is opened to supply compressed air from the storage tank 12, the fuel valve 118 may be opened and thus a combustible mixture will be delivered to the mixing nozzle 94, which will be ignited by the spark plug 120. The combustion products thus supplied under pressure will be delivered to the power units for operating the same. As will be apparent, the adjustment of the spring pressure at 114 upon the valve stem together with the setting of the diaphragm 106 can be such that any desired pressure can be maintained in the combustion products generator, and such pressure will be automatically maintained as long as the power plant is operating.

At this point it may be observed that the storage reservoir 12 is provided with a pressure relief safety valve 126 of any conventional design and a similar valve, not shown, may be provided for the combustion products generator if desired.

Referring now to Figure 1 it will be seen that the combustion products discharge conduit 90 is provided with a branch conduit 128 which communicates with the midportion of a header 130 by which combustion products are supplied to the opposite ends of the power unit 16 as set forth hereinafter, and with a further branch conduit 132 by means of which combustion products are supplied to the power unit 18 with a somewhat different arrangement in a manner to be subsequently set forth.

Means are provided for manually regulating the closing force of the valve spring 114 and thereby control the proportion of fuel supplied to the air entering the generator 10. The lever 115, pivoted upon a support bracket 117 is operably connected to the spring in any suitable manner, as suggested diagrammatically in Figures 1 and 13 for manually varying the closing force applied by the spring 114 to the valve stem 108.

*Fluid supply and exhaust system for the power and compressor units*

As previously mentioned, the fluid inducted into and discharged from the compressor unit and the power units is conducted and controlled through valve and passage means disposed in the hollow crank throws and crankshafts of these units.

Referring first to the compressor unit 14, it will be seen that the crank throw 74 is hollow. As shown best in Figure 9, the compressor cylinders 70 are mounted at one end of each upon a block 140 which is journaled upon the previously mentioned crank throw 74. This crank throw has an opening to the atmosphere at one end thereof as at 142 for the intake of air and a dividing partition 144 is disposed in this crank throw extending longitudinally thereof. The crank throw upon opposite sides of the partition is provided with inlet and exhaust ports 146 and 148 respectively, adapted to successively register with the ports 150 in the block 140 which latter ports communicate at all times with the interior of the cylinder 70.

Figures 10, 17, 18, 19:
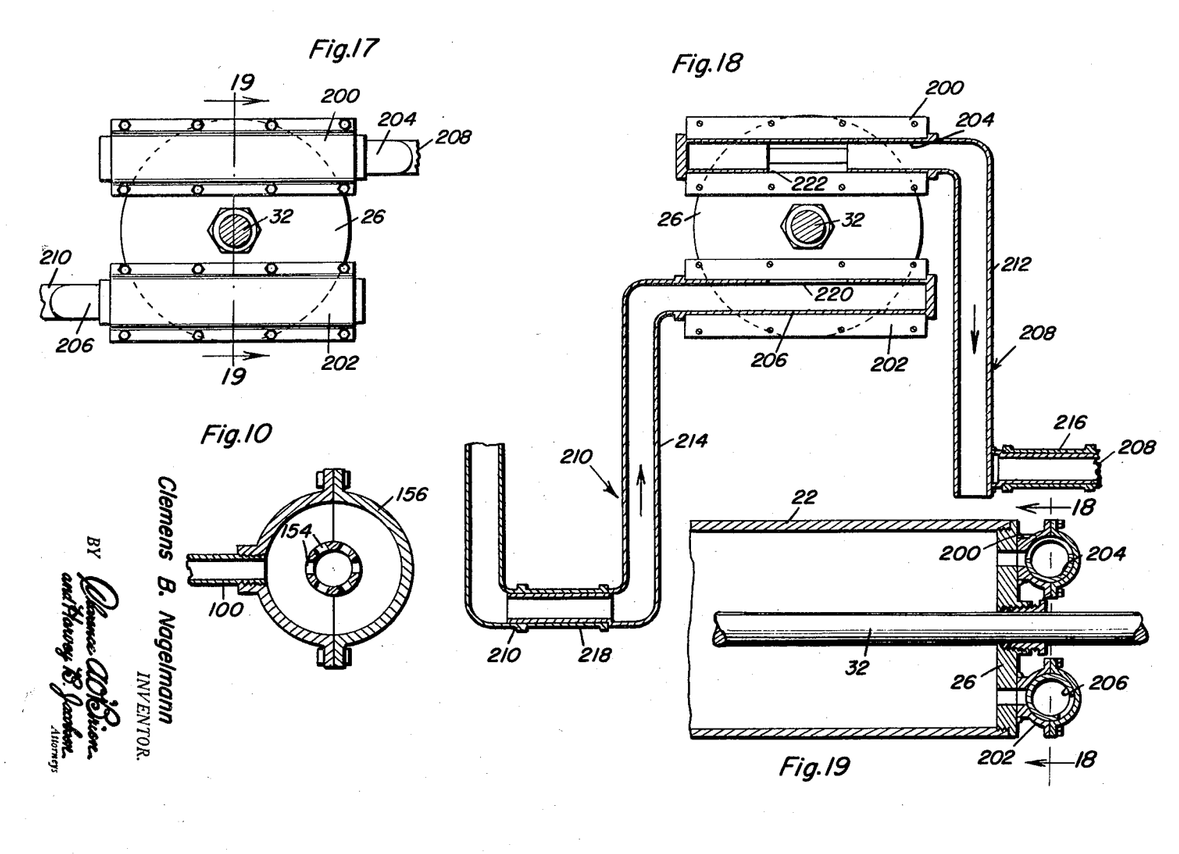
Figure 10 is a detailed view taken in vertical section substantially upon the plane indicated by the section line 10—10 of Figure 1 and showing a portion of the compressed air discharge manifold of the apparatus.
Figure 17 is an end elevational view of a modification showing the mounting of one of the cylinders of the power unit upon separate crank throws of separate crankshafts and with separate intake and exhaust valve mechanisms.
Figure 18 is a view similar to Figure 17 but upon an enlarged scale, taken substantially upon the plane of the section lines 18—18 of Figure 19.
Figure 19 is a vertical central sectional view taken substantially upon a plane indicated by the section line 19—19 of Figure 17.

Consequently, as the crank throw rotates within the block 140, and as the pistons 84 move outwardly therefrom in the cylinders, atmosphere from the continuously open port 142 will simultaneously enter each of the cylinders through the air inlet ports 146 to charge the cylinders; and upon 180° of rotation of the crankshaft, as indicated in Figure 9 the inlet ports 146 will move out of registration, and the exhaust ports 148 in their turn will register with the cylinder ports 150, and the compressed air will then be discharged during the inward travel of the pistons 84 through the outlet ports 148 into the crankshaft on the other side of the partition 144. This discharged compressed air will then travel through the hollow crank arm 152. The passage in the latter communicates with radially disposed discharge ports 154 in the crankshaft 44, and as shown in Figure 10 the compressed air then enters a stationary housing 156 which is suitably mounted upon the framework 54 and which constitutes a collector for receiving the compressed air from the compressor units. The housing 156 in turn communicates with the previously mentioned compressed air supply conduit 100 whereby the compressed air is delivered to the storage tank or the combustion products generator as previously set forth.

Obviously, a non-return check valve of any suitable construction, not shown, may be incorporated at any desired location in the compressed air discharge passages in the crank throw 74, crank arm 152 or crankshaft 44 whereby to prevent back flow into the compressor cylinders 70.

Similarly, a non-return valve, not shown, may be provided in the air inlet 142.

As previously mentioned, combustion products are delivered by the discharge conduit 90 from the generator 10 to the branch manifold 128 and from thence to the midportion of the header 130 whose extremities in turn deliver the combustion products to the opposite ends of the working cylinder 22 of the power unit 16 through the crank shafts 44 and 46. As will be readily seen from Figure 2, the opposite ends of the header 130 have a telescoping rotatable pressure tight fit with the hollow crankshafts 44 and 46 for supplying combustion products to the interior thereof.

As shown best in Figure 6 the crank throws 40 and 42 of these two crankshafts have longitudinally extending diametrically disposed webs or partitions 158 and 160, and are further provided with combustion products inlet and outlet ports, on opposite sides of the webs 158 and 160, shown at 162 and 164 for the throw 40, and 166 and 168 for the throw 42. As shown by the arrows in Figure 6, pressure fluid introduced from the header 130 enters the opposite ends of the cylinder 22 on opposite sides of the piston 34 in properly timed relation by the ports 162 and 166, to thus initiate the working stroke of the double-acting piston 34, and the combustion products are exhausted through the ports 164 and 168 respectively to the opposite ends of the crank throws when that side of the working piston is undergoing its exhaust stroke.

Figure 2:
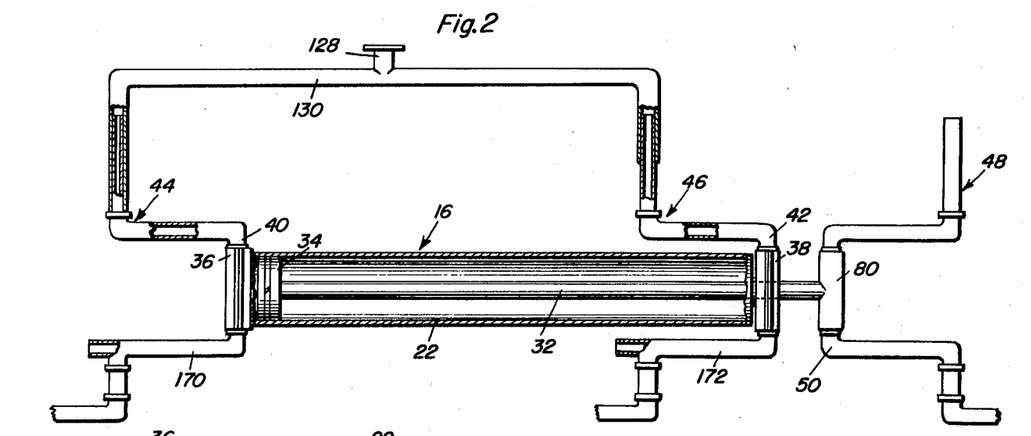
Figure 2 is a fragmentary view of a portion of a power unit in Figure 1, parts being broken away and portions being shown in section and showing the cylinder and piston displaced 180° from the position shown in Figure 1, or upon the beginning of the in stroke of the piston in the cylinder, the arrows indicating the directions of fluid flow therein.
Figure 3:
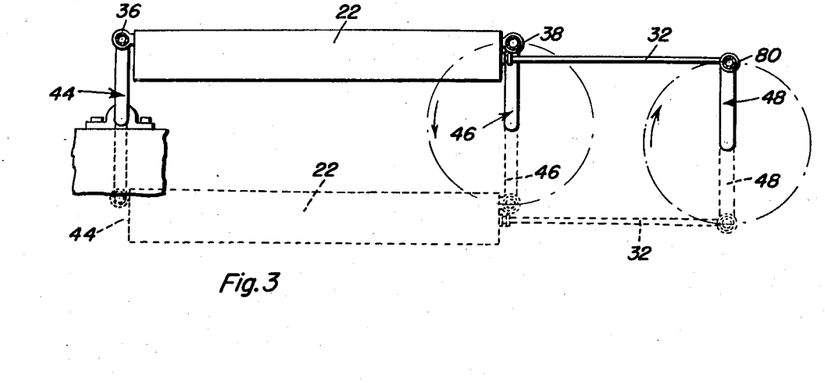
Figure 3 is a somewhat diagrammatic side elevational view upon a reduced scale, parts being broken away, of the cylinder and piston of Figure 1 and showing in full lines the position of the parts intermediate the positions of Figures 1 and 2, and in dotted lines indicating the position of parts at an 180° interval thereafter.
Figure 4:
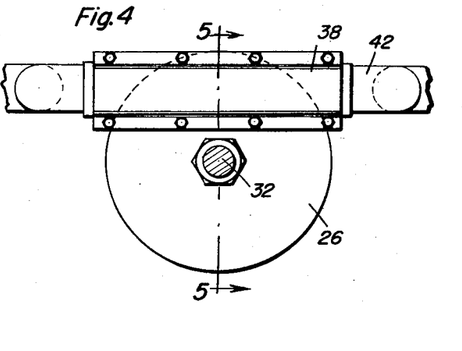
Figure 4 is an end elevational view of one of the cylinders of a power unit, being taken from right end of Figure 6, the piston rod being shown in section.

As shown in Figures 1, 2 and 6, the combustion products discharged from the cylinder 22 of the working unit is discharged through the open ends of the hollow crank arms 170 and 172 of the crank throws 40 and 42 respectively into the atmosphere as shown or into any suitable exhaust gas collecting means desired. Non-return check valves, not shown, may be employed in the crank arms 170 and 172 to prevent return flow, if desired.

A somewhat different arrangement is provided for supplying the combustion products through the branch conduit 132 to the working cylinder 22 of the unit 18. For this purpose, the branch conduit 132 communicates in series with a pair of distributor casings or housings 174 and 176 which deliver the combustion products into their hollow crankshafts 44 and 46 adjacent the cylinders 22 of the unit 18, this construction being substantially identical with that shown in Figure 10 in connection with the casings 156. This arrangement is necessitated since the gears 56 and 58 are disposed at these ends of the crankshafts 44 and 46, and thus a header could not conveniently be attached to the ends in the same manner as the header 130 for the other unit 16.

Figures 11 and 12 disclose a modified form of the valve assembly of the compressor unit. This construction may be employed as a substitute for the valve assembly of Figures 17-19.

The essential distinction of the valve arrangement of Figures 11 and 12 over those of Figures 8 and 9 is that in place of the single relatively large inlet and outlet port in the crank throw, there is substituted a plurality of smaller ports or passages in the tubing of the crank throw with a much less weakening of the structural strength thereof. In this embodiment, the dual crankshaft and casing arrangement of Figures 17 and 18 is employed in the compressor cylinders 170 of Figures 8 and 9. However, in place of the large single ports 220 and 222 employed for the intake and exhaust respectively of each compressor cylinder, there is provided the multiple port arrangement shown at 145 in the crank throws 204 and 206 together with the resilient steel blade or plate 147 riveted or fixedly secured at one edge as at 149 to the interior of the crank throw. The valve plate 147 in the throw 206 will admit air to the interior of the associated cylinder 170 while that in the throw 204 will discharge compressed air to the conduit 100. Obviously the latter valve will open only when the pressure within the compressor cylinders exceeds that in the conduit 100 which is in continuous communication with the throw 204.

Figures 17-19 disclose a modified construction of the power unit. In this embodiment the single crankshafts 44 and 46 which support the opposite ends of the cylinders 22 are replaced by a pair of crankshafts at each end of the cylinders for supporting the latter. Thus the power cylinder 22 has each of its end plates 24 and 26 provided with a pair of upper and lower, transversely extending housings 200 and 202 spaced vertically and on opposite sides of the piston rod 32. These housings journal therein the hollow cranks 204 and 206 respectively of the two crank shafts 208 and 210 having the hollow crankarms 212 and 214. The crankshafts are journaled at 216 and 218 in bearings which are vertically spaced the same distance as the housings 200, 202 and since this arrangement is duplicated at each end of the cylinders, the latter in their rotation remain in parallel positions.

The crank throws 204, 206 are ported in the housings 200, 202 to respectively provide outlet ports 222 and inlet ports 221 in the shafts 208 and 210, respectively. As in the preceding embodiment, combustion products are supplied from the previously mentioned supply conduits 130 and 132 to the crank throws 214 of the crankshafts 210 while exhaust is discharged through the open ends of the throws 212 of the crankshafts 208, as shown in Figure 18.

It will be understood that the previously mentioned crankshaft 48 is provided for actuating the piston rod 32.

The operation of this form of the invention is identical with that of Figures 1-16 except for the mechanical construction and action of the pairs of vertically spaced crankshafts and crank throws which support each other of each power unit.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A power plant comprising a generator for combustion products, a power unit operatively connected to said generator for receiving said combustion products, a compressor unit for supplying compressed air to said generator, means for supplying a combustible product to said generator, means for mixing said compressed air and fuel to provide a combustible mixture, means for igniting said mixture in said generator, means drivingly connecting said power unit and said compressor unit for simultaneous operation, said units each including cylinders and pistons, a pair of parallel crankshafts supporting said cylinders at opposite ends thereof and confining the latter to translatory rotation, a third crankshaft connected to said pistons, a power shaft connected to each of said crankshafts and synchronizing the operation thereof.

2. A power plant comprising a generator for combustion products, a power unit operatively connected to said generator for receiving said combustion products, a compressor unit for supplying compressed air to said generator, means for supplying a combustible product to said generator, means for mixing said compressed air and fuel to provide a combustible mixture, means for igniting said mixture in said generator, means drivingly connecting said power unit and said compressor unit for simultaneous operation, said units each including cylinders and pistons, a pair of parallel crankshafts supporting said cylinders at opposite ends thereof and confining the latter to translatory rotation, a third crankshaft connected to said pistons, a power shaft connected to each of said crankshafts and synchronizing the operation thereof, means for inducting motive fluid into and educting motive fluid from said cylinders through one of said crankshafts.

3. A power plant comprising a generator for combustion products, a power unit operatively connected to said generator for receiving said combustion products, a compressor unit for supplying compressed air to said generator, means for supplying a combustible product to said generator, means for mixing said compressed air and fuel to provide a combustible mixture, means for igniting said mixture in said generator, means drivingly connecting said power unit and said compressor unit for simultaneous operation, said units each including a cylinder and piston, a pair of parallel crankshafts having crank throws journaled in and supporting opposite ends of said cylinder, means in one of said crankshafts for supplying motive fluid to and educting motive fluid from said cylinder, valve means in one of said crank throws for controlling flow of fluid through said last mentioned means.

4. A power plant comprising a generator for combustion products, a power unit operatively connected to said generator for receiving said combustion products, a compressor unit for supplying compressed air to said generator, means for supplying a combustible product to said generator, means for mixing said compressed air and fuel to provide a combustible mixture, means for igniting said mixture in said generator, means drivingly connecting said power unit and said compressor unit for simultaneous operation, said power unit including a cylinder and piston, a pair of crankshafts having crank throws which are journaled in and support opposite ends of said cylinder, means in each crankshaft for supplying motive fluid into and educting motive fluid from said cylinder, non-return valve means in at least one of said crank throws.

5. A power plant comprising a generator for combustion products, a power unit operatively connected to said generator for receiving said combustion products, a compressor unit for supplying compressed air to said generator, means for supplying a combustible product to said generator, means for mixing said compressed air and fuel to provide a combustible mixture, means for igniting said mixture in said generator, means drivingly connecting said power unit and said compressor unit for simultaneous operation, said power unit including a cylinder and piston, a pair of crankshafts having crank throws which are journaled in and support opposite ends of said cylinder, means in each crankshaft for supplying motive fluid into and educting motive fluid from said cylinder, non-return valve means in at least one of said crank throws, means venting to the atmosphere the interior of one of the crank throws.

6. In a power plant, a cylinder with a piston reciprocable therein, a pair of transversely extending sleeves mounted on opposite ends of said cylinder, a pair of crankshafts having crank throws journaled in and supporting said sleeves, a third crankshaft operatively connected to said piston, means in one of said pairs of crankshafts for admitting motive fluid into and educting fluid from said cylinder.

7. The combination of claim 6 wherein said last mentioned means includes inlet and exhaust ports in said crank throws successively registering with the interior of the cylinder through a combined inlet and exhaust port in said sleeve whereby to provide a control valve for said cylinder.

8. A power plant comprising a generator for combustion products, a power unit operatively connected to said generator for receiving said combustion products, a compressor unit for supplying compressed air to said generator, means for supplying a combustible product to said generator, means for mixing said compressed air and fuel to provide a combustible mixture, means for igniting said mixture in said generator, means drivingly connecting said power unit and said compressor unit for simultaneous operation, a pair of crankshafts journaling opposite ends of said units, conduit means for said power unit and said compressor unit including passage means in said pair of crankshafts providing air inlet means for said compressor unit and compressed air discharge means therefor.

9. A power plant comprising a generator for combustion products, a power unit operatively connected to said generator for receiving said combustion products, a compressor unit for supplying compressed air to said generator, means for supplying a combustible product to said generator, means for mixing said compressed air and fuel to provide a combustible mixture, means for igniting said mixture in said generator, means drivingly connecting said power unit and said compressor unit for simultaneous operation, a pair of crankshafts journaling opposite ends of said units, conduit means for said power unit and said compressor unit including passage means in said pair of crankshafts providing air inlet means for said compressor unit and compressed air discharge means therefor and fluid inlet means for said power units.

10. A power plant comprising a generator for combustion products, a power unit operatively connected to said generator for receiving said combustion products, a compressor unit for supplying compressed air to said generator, means for supplying a combustible product to said generator, means for mixing said compressed air and fuel to provide a combustible mixture, means for igniting said mixture in said generator, means drivingly connecting said power unit and said compressor unit for simultaneous operation, a pair of crankshafts journaling opposite ends of said units, conduit means for said power unit and said compressor unit including passage means in said pair of crankshafts providing air inlet means for said compressor unit and compressed air discharge means therefor and fluid discharge means for said power unit and exhausting to the atmosphere.

11. A power plant comprising a generator for combustion products, a power unit operatively connected to said generator for receiving said combustion products, a compressor unit for supplying compressed air to said generator, means for supplying a combustible product to said generator, means for mixing said compressed air and fuel to provide a combustible mixture, means for igniting said mixture in said generator, means drivingly connecting said power unit and said compressor unit for simultaneous operation, a pair of crankshafts journaling opposite ends of said units, conduit means for said power unit and said compressor unit including passage means in said pair of crankshafts providing air inlet means for said compressor unit and compressed air discharge means therefor and fluid inlet means for said power units and fluid discharge means for said power unit and exhausting to the atmosphere.

12. The combination of claim 6 including a common power shaft, means connecting each crankshaft to said power shaft.

References Cited in the file of this patent

UNITED STATES PATENTS

| | | |
|---|---|---|
| 2,390,169 | Pogioli | Dec. 4, 1945 |
| 2,603,063 | Ray | July 15, 1952 |

FOREIGN PATENTS

| | | |
|---|---|---|
| 398,356 | France | Mar. 22, 1909 |